B. A. PETERSON.
MAGAZINE LOADER.
APPLICATION FILED JUNE 3, 1911.
1,062,848.
Patented May 27, 1913.
4 SHEETS—SHEET 3.
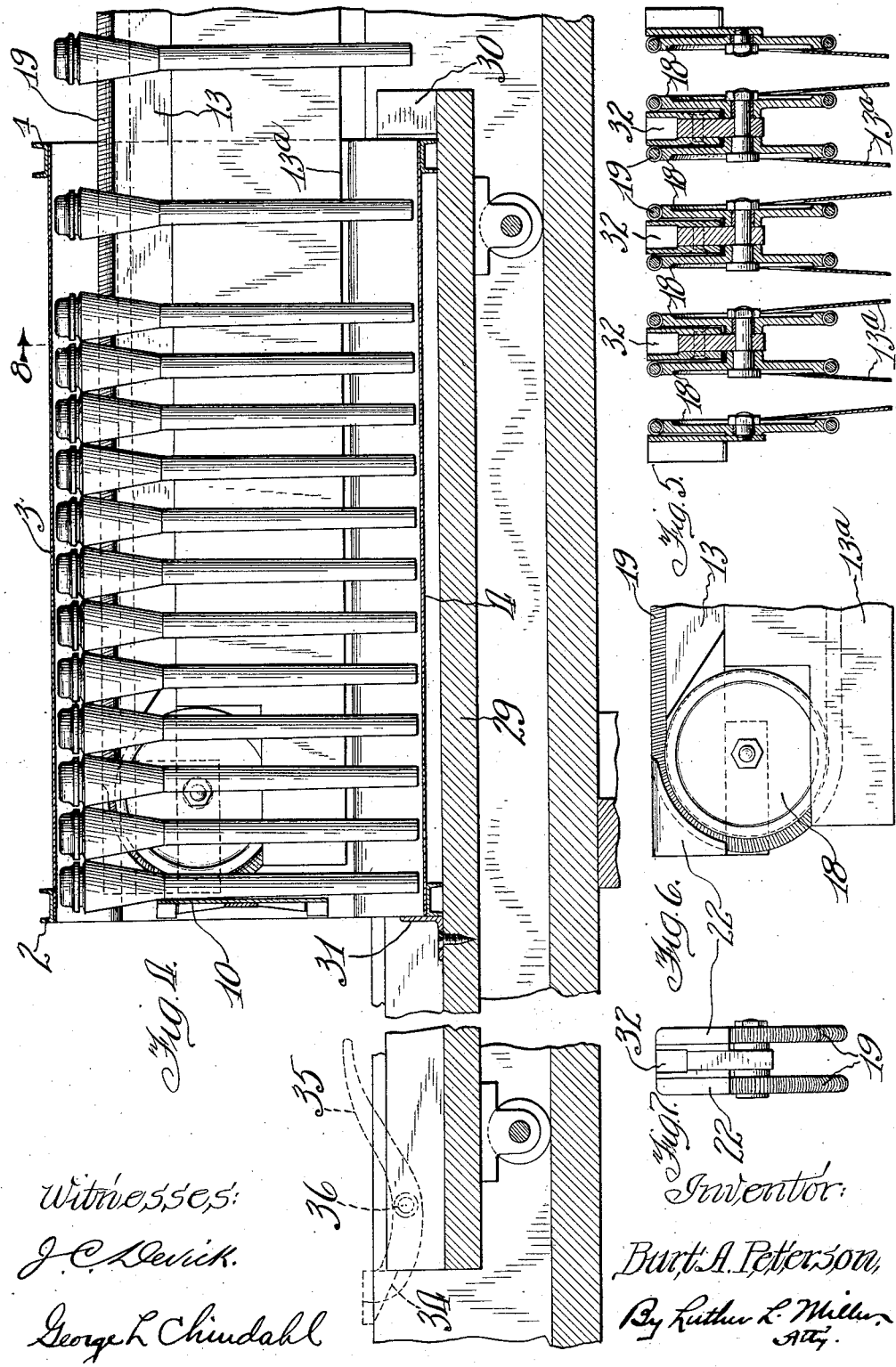

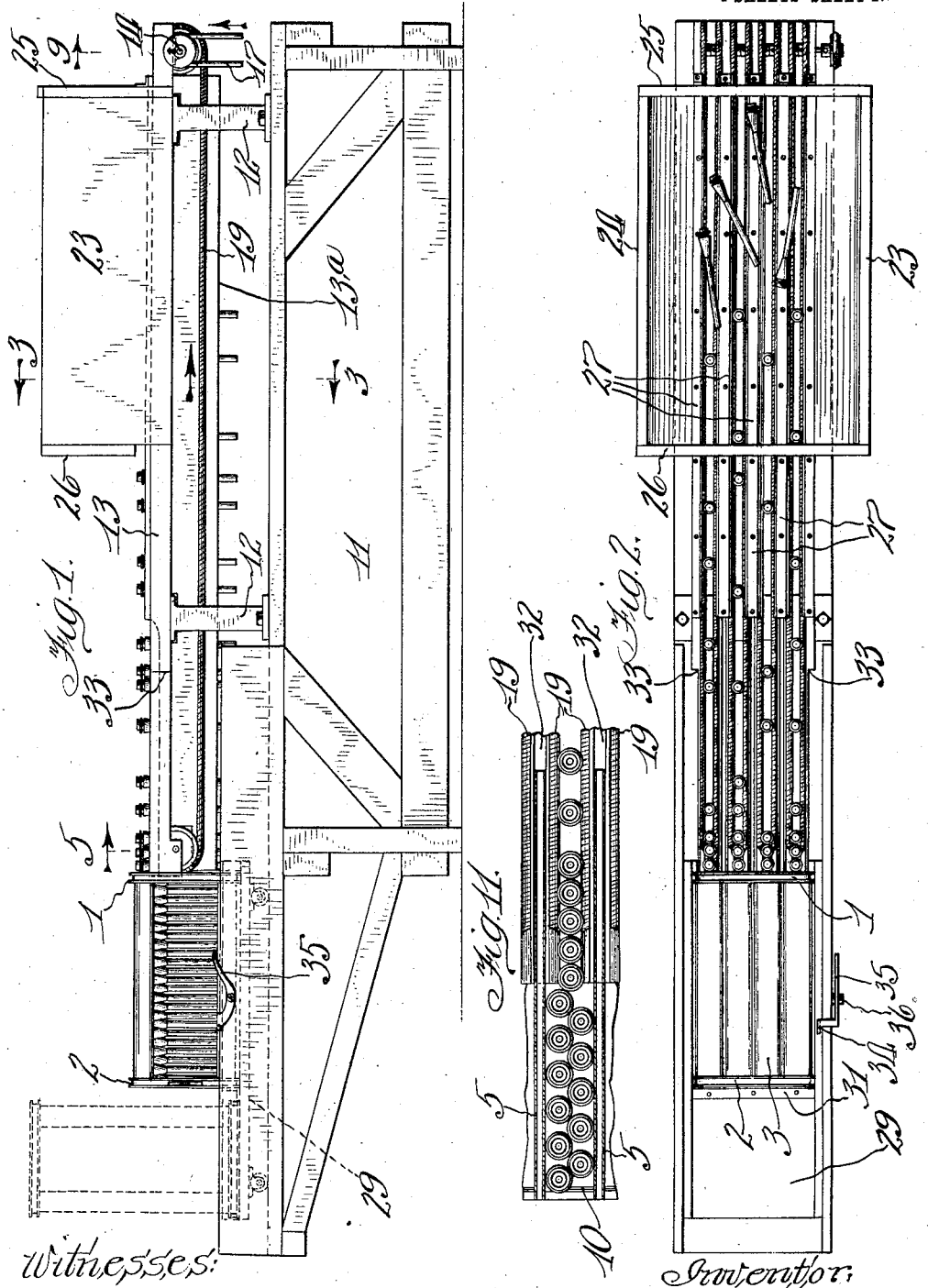

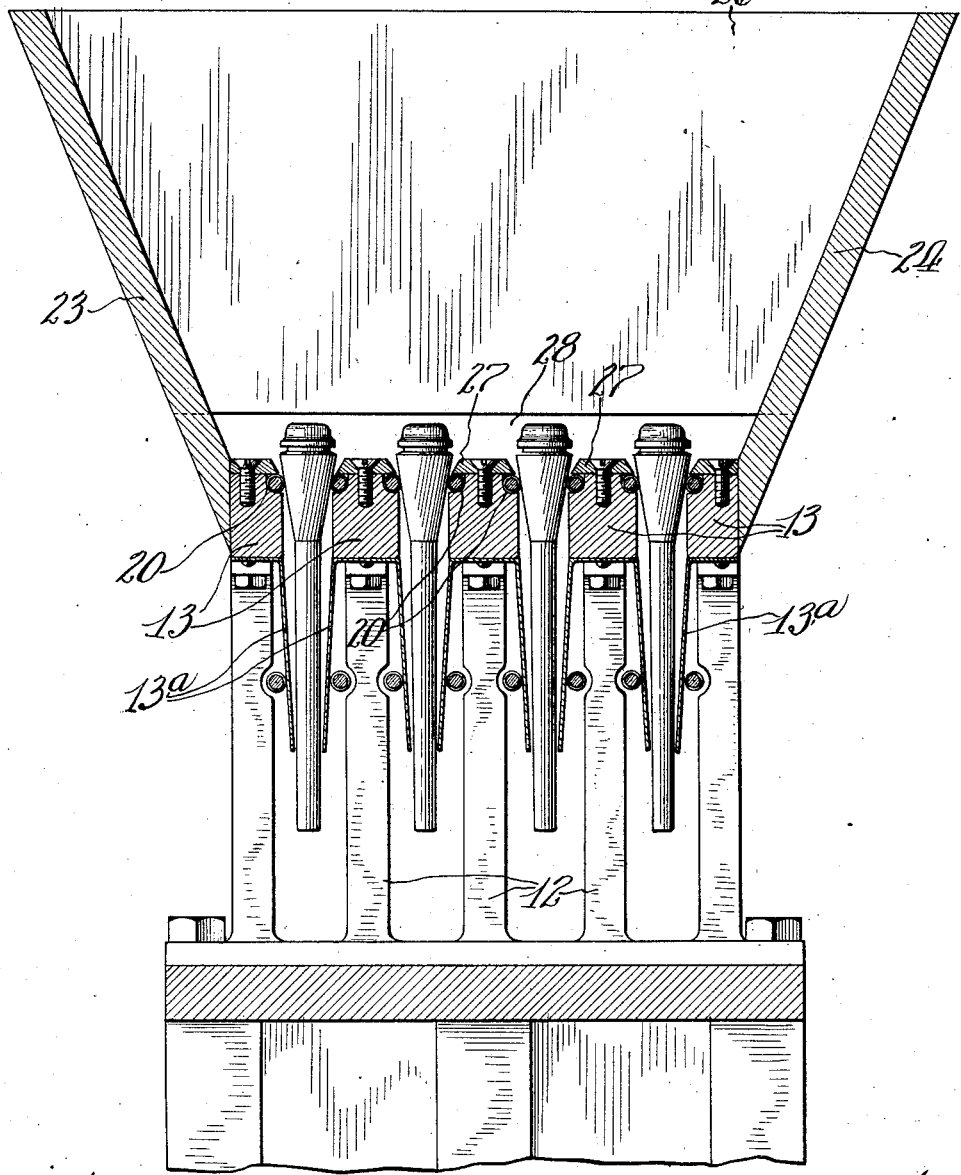

B. A. PETERSON.
MAGAZINE LOADER.
APPLICATION FILED JUNE 3, 1911.
1,062,848.
Patented May 27, 1913.
4 SHEETS—SHEET 4.
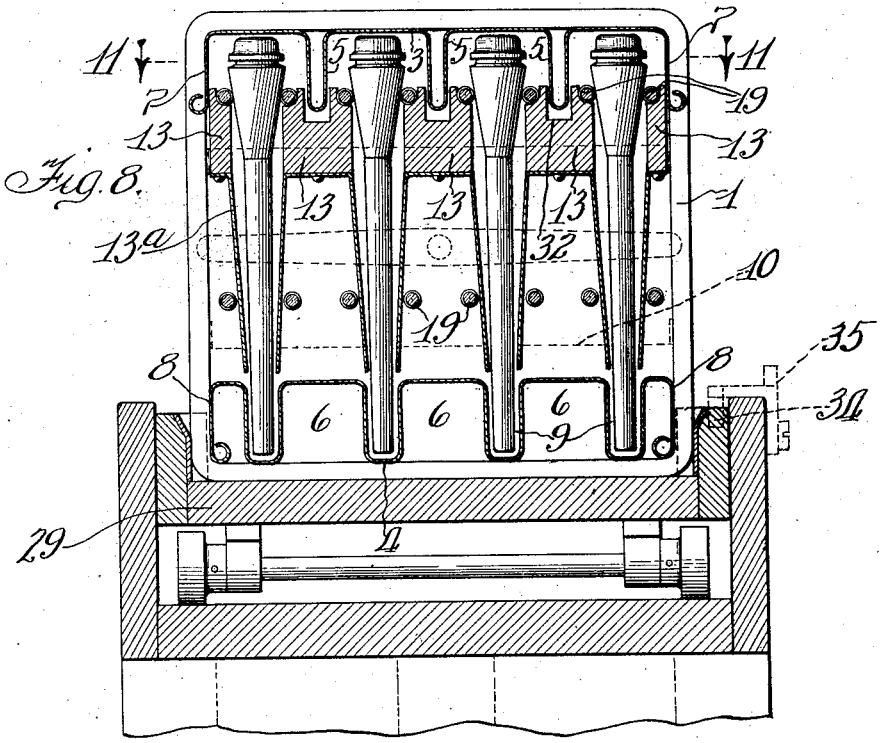
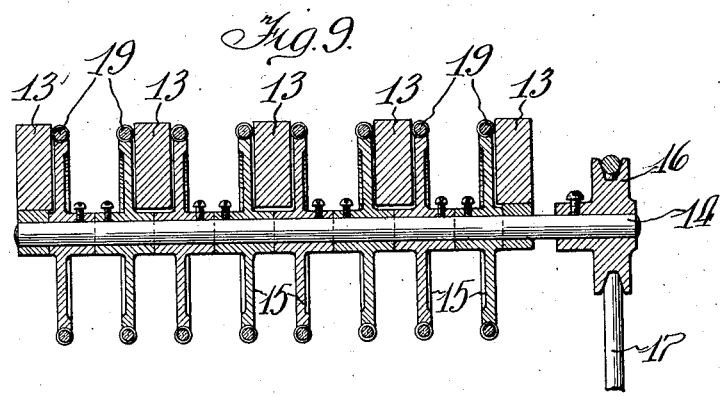
Witnesses:
J. C. Devick
George L. Chindahl
Inventor:
Burt A. Peterson,
By Luther L. Miller
Atty.

UNITED STATES PATENT OFFICE.

BURT A. PETERSON, OF ROCKFORD, ILLINOIS, ASSIGNOR TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

MAGAZINE-LOADER.

1,062,848.  Specification of Letters Patent.  Patented May 27, 1913.

Application filed June 3, 1911. Serial No. 631,041.

*To all whom it may concern:*

Be it known that I, BURT A. PETERSON, a citizen of the United States, residing at Rockford, in the county of Winnebago and State of Illinois, have invented certain new and useful Improvements in Magazine-Loaders, of which the following is a specification.

The object of this invention is to produce an apparatus for filling or loading bobbin-magazines, such magazines, for example, as are employed in connection with spinning-frame doffers of the portable type.

In the accompanying drawings, Figure 1 is a side elevation of one form of apparatus embodying my invention. Fig. 2 is a top plan view thereof. Fig. 3 is a sectional view taken in the plane of dotted line 3—3 of Fig. 1. Fig. 4 is a fragmental longitudinal section through the apparatus, with a magazine in operative relation thereto. Fig. 5 is a section through the bobbin-moving means on line 5 of Fig. 1. Figs. 6 and 7 are fragmental side and end elevations of said bobbin-moving means. Fig. 8 is a sectional view taken on line 8 of Fig. 4. Fig. 9 is a section through the bobbin-moving means on line 9 of Fig. 1. Fig. 10 illustrates a portion of a belt included in the present embodiment of the bobbin-moving means. Fig. 11 is a fragmental view illustrating a magazine in operative relation to the loader, the magazine being sectional in a plane corresponding to that indicated by dotted line 11—11 of Fig. 8.

The details of an embodiment of this invention will correspond to the form of magazine to be loaded. I will therefore first outline the construction of one form of magazine which may be filled by means of the present embodiment. The magazine comprises two end frames 1 2 and two opposite metallic walls 3 4 bent to provide partitions 5 6 and partial walls 7 8. It will be seen from Fig. 8 that the partitions 6 are so arranged as to form longitudinal grooves 9 wide enough to receive only a bobbin-tip, whereby the tips of bobbins placed in the magazine are alined. The partitions 5 are spaced apart a distance considerably greater than the diameter of a bobbin-butt, but less than twice the diameter of a bobbin-butt, whereby the bobbin-butts are free to arrange themselves in staggered relation, as indicated in Fig. 11. One end of the magazine is provided with a removable closure or bottom 10 (Fig. 4).

The magazine herein illustrated is designed to contain four tiers of bobbins arranged with their tips extending in the same general direction, therefore the present embodiment of the invention is adapted to sort a confused mass of bobbins into four rows with the tips of the bobbins extending in the same direction, the machine also being adapted to feed the rows of bobbins into the magazine.

11 designates an elongated, horizontally extending framework. Rising from said framework are posts 12 carrying five parallel horizontal rails 13. The spaces between these rails constitute slots of sufficient width to receive bobbin-tips, but not wide enough to allow bobbin-butts to pass down therethrough. Operatively supported near one end of the rails 13 is a shaft 14 carrying eight sheaves or grooved pulleys 15 (Fig. 9), located adjacent to one side of rails 13. The shaft 14 may be arranged to be driven in any suitable way, as, for example, by means of a pulley 16 and a belt 17. At the opposite end of the set of rails 13 are suitably supported grooved pulleys 18 (Fig. 5) each arranged adjacent to one side of a rail 13. Over the pulleys 15 and 18 extend belts 19, the rails 13 being grooved as at 20 to accommodate the belts. To render the belts more durable, each belt may, if desired, be provided with a suitable flexible metallic covering as, for example, a coiled spring 21 (Fig. 10). Fixed with relation to the rear ends of the rails 13 are members 22 the upper rounded edges of which are alined with the upper runs of the belts 13.

Walls 23, 24, 25 and 26, secured in place above the forward portions of the rails 13 form in conjunction with said rails a hopper to receive bobbins to be sorted and loaded into magazines. To the portions of the rails forming the bottom of the hopper are secured strips 27 partially overlying the belts 19. These strips may extend a suitable distance beyond the side 26 of the hopper, as indicated in Fig. 2. The side 26 terminates at a point above the rails 13 so as to provide an opening 28 (Fig. 3) of sufficient height to permit the passage of bobbins only when the latter extend vertically between the rails.

The movement of the belts 19 causes bobbins placed in the hopper to assume positions parallel with the rails, whereupon they swing downward between the rails into the position indicated in Figs. 1 and 2. To prevent lateral swinging of the bobbins, plates 13ª are provided below the rails 13, to lie at opposite sides of the spaces between said rails. In the continued movement of the belts the sorted bobbins are conveyed to the left-hand end (Fig. 1) of the set of rails 13 and inserted into the magazine.

To support the magazine I provide a carriage 29 movable in the supporting framework 11 toward and away from the sorting and feeding mechanism. As indicated in Figs. 1 and 2, the carriage 29 is long enough to support a magazine lying upon its side 4 and to permit of tilting the magazine into vertical position as shown in dotted lines in Fig. 1. The magazine is held in place on the carriage 29 between stop blocks 30 (Fig. 4) and a flange 31.

In order that the bobbins shall be maintained in proper order until they are fully inserted into the magazines, I adapt the feeding or inserting mechanism so that the magazine may be placed thereupon as represented in Fig. 4. The outermost rails 13 are reduced in thickness, and the other rails are grooved, as at 32, to accommodate the partitions 5. The forward movement of the carriage 29 is limited by contact of the magazine with the shoulders 33 formed by the reduction in thickness of the outer rails. The carriage is locked in this forward position by a projection 34 on a lever 35 pivoted at 36. When the magazine is in contact with the stop shoulders 33, the members 22 are close to the bottom 10 of the magazine. The belts 19 feed the bobbins rearwardly into the magazine, and the bobbins are allowed to accumulate in their slots some distance forwardly of the magazine, the belts slipping past the bobbins after the latter have been moved rearwardly as far as possible. The number of bobbins necessary to fill the magazine occupy a space about twice the length of the magazine because they extend in single rows, whereas their normal position in the magazine is in staggered relation to each other, as shown in Fig. 11. When the spaces between the rails 13 have been filled up as far as the hopper, the operator swings the latch lever 35 to release the carriage 29, when the latter will be forced back by the frictional engagement of the belts 19 with the bobbins in the magazine. As the bobbins-butts leave the spaces between the belts, the butts arrange themselves in staggered relation, as illustrated in Fig. 11. The magazine having been filled, the operation of the belts 19 is stopped, and the magazine is turned into an upright position and is lifted off the carriage 29. Another magazine is then placed thereon, the carriage advanced into loading position, and the belts 19 set in operation.

I claim as my invention:

1. In a bobbin-magazine loader, the combination of a plurality of parallel belts arranged to support between them bobbins extending transversely of the belts, means for supporting a magazine so as to inclose a portion of the belts, and means for moving the belts to feed bobbins into the magazine.

2. In a bobbin-magazine loader, the combination of a plurality of parallel belts arranged to support between them bobbins extending transversely of the belts, means for normally supporting a magazine so as to inclose a portion of the belts, and means for moving the belts to feed bobbins into the magazine, the magazine-supporting means permitting the magazine to yield to the pressure of the bobbins as the latter are fed into the magazine.

3. In a bobbin sorter, the combination of a set of spaced parallel rails, a hopper-like structure supported over a portion of said set of rails, endless bobbin-engaging belts supported so that certain runs of said belts extend along opposite sides of the spaces between the rails, said rails being longitudinally grooved to support the belts, members extending along the rails and partially overlying the portions of the belts within the grooves, and means for moving said belts.

4. In a bobbin-magazine loader, the combination of a set of spaced parallel rails, wheels mounted at one end of said set of rails, bobbin-engaging belts extending over said wheels and along opposite sides of the spaces between the rails, members supported adjacent to said wheels and having their upper edges alined with the portions of the belts extending along the rails, means for supporting a magazine so as to inclose the end of the said rails at which the wheels are located, and means for moving said belts to feed bobbins into the magazine.

5. In a bobbin-magazine loader, the combination of a hopper-like structure, bobbin-sorting and feeding means extending from said structure, and means for supporting a magazine so as to inclose a portion of said sorting and feeding means.

6. In a bobbin-magazine loader, the combination of a hopper-like structure, bobbin-sorting and feeding means extending from said hopper-like structure, and a carriage movable in the direction of extension of said sorting and feeding means and adapted to support a magazine, a portion of said feeding means being adapted to be inclosed by a magazine placed on said carriage.

7. In a bobbin-magazine loader, the combination of two movable parallel members spaced apart a distance greater than the diameter of a bobbin tip and less than the diameter of a bobbin butt; and guides below said members, said guides forming channels adapted to register with grooves in the magazine to be loaded.

8. In a bobbin-magazine loader, the combination of a hopper-like structure; bobbin-sorting and feeding means extending from said structure; means for supporting a magazine so as to inclose a portion of said feeding means; and releasable means normally preventing motion of said magazine away from said feeding means.

In testimony whereof I hereby affix my signature in the presence of two witnesses.

BURT A. PETERSON.

Witnesses:
 JOHN F. ELWOOD,
 LOUISE A. CULVER.

Copies of this patent may be obtained for five cents each, by addressing the "Commissioner of Patents, Washington, D. C."